Figure 1:
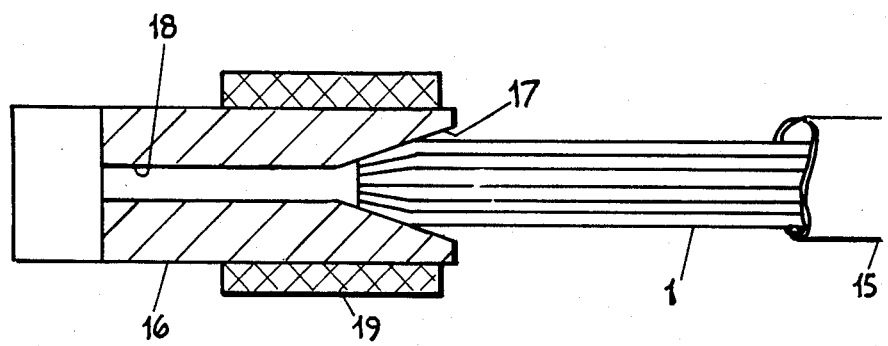

United States Patent [19]
Lewis

[11] 4,116,655
[45] Sep. 26, 1978

[54] METHOD FOR MAKING OPTICAL-FIBRE CABLES

[75] Inventor: Edward Lloyd Lewis, Maidstone, England

[73] Assignee: Elliott Brothers (London) Limited, Chelmsford, England

[21] Appl. No.: 701,240

[22] Filed: Jun. 30, 1976

[30] Foreign Application Priority Data

Jul. 9, 1975 [GB] United Kingdom ............... 28879/75
Jul. 10, 1975 [GB] United Kingdom ............... 29094/75
Oct. 31, 1975 [GB] United Kingdom ............... 45220/75

[51] Int. Cl.² ............................................. C03B 23/20
[52] U.S. Cl. ................................. 65/4 B; 65/DIG. 7; 156/180; 156/296; 350/96.22
[58] Field of Search ............... 65/2, 4 B, DIG. 7; 156/180, 296; 350/96 B, 96.22; 29/517; 72/352, 356

[56] References Cited

U.S. PATENT DOCUMENTS

| 3,556,636 | 1/1971 | Roberts et al. | 65/DIG. 7 |
| 3,912,362 | 10/1975 | Hudson | 65/DIG. 7 |
| 3,999,837 | 12/1976 | Bowen et al. | 350/96.22 |

FOREIGN PATENT DOCUMENTS

1,465,493  2/1977  United Kingdom ............... 65/4 B

*Primary Examiner*—Robert L. Lindsay, Jr.
*Attorney, Agent, or Firm*—Kirschstein, Kirschstein, Ottinger & Cobrin

[57] ABSTRACT

An improved fibre-optic cable termination which substantially reduces light losses and also facilitates cable termination in the field as opposed to the factory.

According to this method the fibres are compressed by pushing the bundle, preferably sheathed in a thin glass ferrule, into a heated tool having a tapered hole. A protective metal coupling may be incorporated by heating a metal sheath with a tapered bore and pushing the glass sheathed bundle into the metal sheath. The metal sheath may then constitute a pin of a pin and socket optical coupling.

In all cases the temperature and pressure are adjusted so that the individual fibres are squeezed into approximately hexagonal form so as to eliminate the interstices to a substantial extent. The temperature and pressure are, however, limited to prevent any substantial fusion and coalescing of fibres and consequent loss of the optical barrier between them.

9 Claims, 6 Drawing Figures

METHOD FOR MAKING OPTICAL-FIBRE CABLES

This invention relates to optical-fibre cables and to methods and equipment for terminating them.

By 'optical-fibre cable' is meant a plurality of optical fibres bunched together. There may be, for example, several hundred individual fibres in such a cable, which may be used in a fibre-optic communication system. A cable has the advantages over single fibres of fibre redundancy in case of breakages and the presentation of a larger area of fibre end to the light source and receiver.

In a complete communication system it becomes necessary to couple lengths of such cable to each other as well as to opto-electronic devices. The cable, or fibre-optic bundle, as it is sometimes called, must therefore be terminated by an optical coupling. A fibre-optic bundle is most frequently terminated by bonding the fibre ends into a metal ferrule and polishing their end faces. The metal ferrule is then adapted to couple mechanically to a similar but complementary such termination or to an opto-electronic device. A disadvantage of such terminations is that perfect alignment between individual fibres is not, in general, possible, and there can be a consequent loss of light across a coupled pair of such terminations of as much as 30%.

One object of the present invention is therefore to provide a terminated optical-fibre cable in which the loss of light transmission referred to above is substantially reduced and also to provide a method and equipment for effecting such a termination.

A further, and in certain applications, more important, disadvantage of the conventional method of terminating a fibre-optic bundle is that it is almost necessarily a factory process. The potting and curing of the fibre ends in epoxy resin or other potting compound requires time and careful assembly. The subsequent grinding and polishing of the fibre end-face requires skill and care, for the individual fibre ends are easily chipped and eroded by the smearing of the potting material across the fibre ends.

A further object is therefore to provide a method of terminating an optical-fibre cable which method is suitable for use by relatively unskilled labour in the field as opposed to the factory.

According to one aspect of the present invention, a method of terminating an optical-fibre cable includes the step of heating and radially compressing the fibres so as to deform them, without any substantial fusion, to cause the elimination, to a substantial extent, of any spaces between the fibres. The fibres are preferably inserted in a deformable ferrule which is compressed onto the fibres so as to deform them as aforesaid. The deformable ferrule and the enclosed fibres may be compressed by forcing the deformable ferrule axially into a tapered hole in a die member.

The die member may be heated and the ferrule and fibres are heated by conduction from the die member.

The die member may be an outer ferrule which at one end is a sliding fit over the deformable ferrule and at the other end has an internal inwardly tapered die portion, the deformable ferrule and the optical fibres being inserted through the said one end and forced into said die portion.

An inner metal driving ferrule which is an easy fit around the optical fibres and a close fit within the outer metal ferrule may be forced into the outer ferrule to drive the deformable ferrule and the enclosed fibres into the die portion of the outer ferrule. The driving ferrule may have a surface portion which is engaged by a ram tool to force the driving ferrule and the deformable ferrule into the outer ferrule. This surface portion may be an abutment surface of a collar of the driving ferrule. The driving ferrule may then be forced into the outer ferrule until the abutment surface engages a stop part of the outer ferrule. The outer ferrule may have an external taper and be heated by conduction from a heating member having a tapered hole complementary to the external taper and which supports and heats the outer ferrule when the deformable ferrule is forced into it. The outer ferrule is preferably of metal and the deformable ferrule of a glass material.

The method may include the preliminary step of pressing the fibres axially into a tapered hole in a heated preforming member so as to compress the ends of the fibres without fusion into a smaller overall cross section and facilitate their insertion into a ferrule having a bore which is a close fit for the fibres prior to the fibre-end compression. In this case, the preforming member may be composed of graphite to prevent adhesion of the fibres.

According to another aspect of the invention, a tool, for use in terminating a fibre-optic cable, comprises a member having a tapered hole in one face and means for heating the member, the taper of the hole being such as to radially compress a bunch of optical fibres forced axially into the hole. The member may be of metal and the heating means may be an electric heating winding. The surface of the hole, or the member itself, may be graphite to prevent adhesion to glass fibres in operation.

Alternatively, a tool for use in terminating a fibre-optic cable, may comprise a heating member having a hole for the insertion of inner and outer ferrules enclosing the fibres of a cable, and a ram tool adapted for forcing the inner ferrule into said hole and into a tapered form.

The hole in the heating member may be tapered to support a correspondingly tapered outer ferrule when a deformable cylindrical inner ferrule enclosing the fibres of a cable is forced therein.

The hole in the heating member may be cylindrical to receive a ferrule having a tapered bore and a cylindrical outer surface. The tool preferably includes a guide member detachably secured to the heating member and having a guide hole axially aligned with but spaced from the hole in the heating member, the guide member maintaining the alignment of the fibres when they are forced into the heating member.

According to a further aspect of the invention, in an optical fibre cable including a coupling termination the fibres are deformed in the region of the termination so as to eliminate to a substantial extent the spaces between fibres in the plane of the coupling surface, without any substantial fusion of the fibres. The fibres in this region are preferably compressed within a radially deformed ferrule which may consist of a glass or metal material. The deformed ferrule may be tightly encased within an outer metal ferrule having a bore a die portion of which is tapered inwardly towards said plane.

The outer metal ferrule may have a portion remote from said plane having a parallel bore which closely encases an inner metal driving ferrule, this driving ferrule being an easy fit around the optical fibres of the cable, and the driving ferrule being in abutment with the deformed ferrule.

The outer metal ferrule may constitute a pin of a male and female optical coupling and may be provided with stop means for limiting the extent of engagement with such a female member.

According to a further aspect of the invention, a connecting pin for an optical-fibre coupling comprises a ferrule having a bore which includes a parallel portion and a tapered die portion adapted to receive and radially compress the fibres of an optical-fibre cable forced axially into the die portion.

Figure 2A:
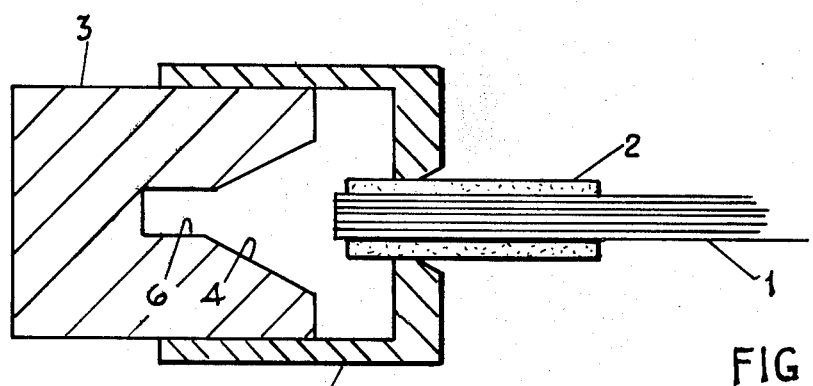
Figure 2B:
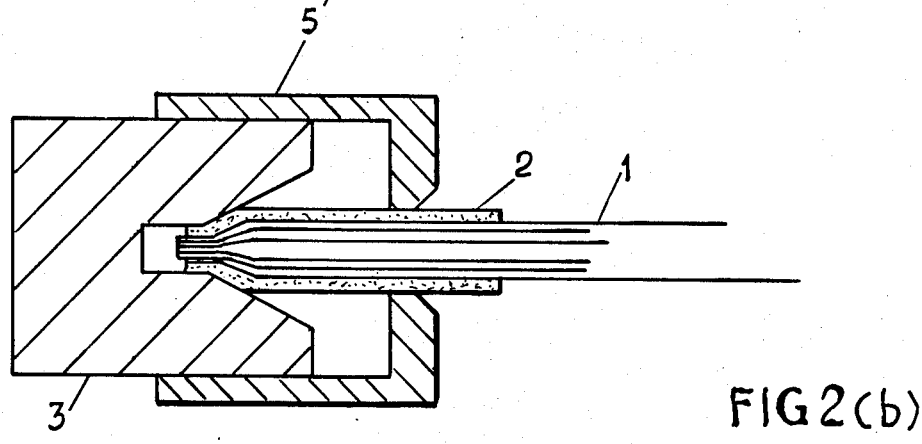
Figure 3A:
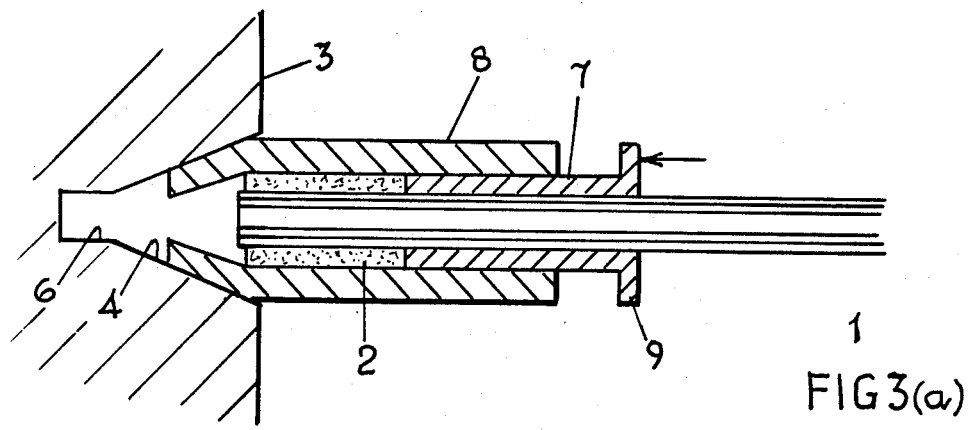
Figure 3B:
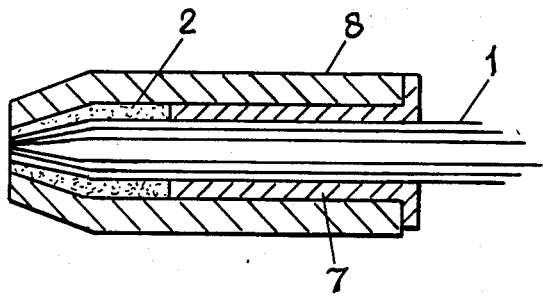

Two methods of terminating an optical-fibre cable in accordance with the invention, the equipment for performing these methods and the resulting cable terminations, will now be described, by way of example, with reference to the accompanying drawings, of which:

FIG. 1 is a diagrammatic cross section of a fibre-optic cable-end in engagement with a pre-forming tool;

FIGS. 2(a) and 2(b) are diagrammatic cross sections of a cable end in engagement with a terminating tool, in two stages of the terminating process;

FIGS. 3(a) and 3(b) are similar views of an alternative termination; and

Figure 4:
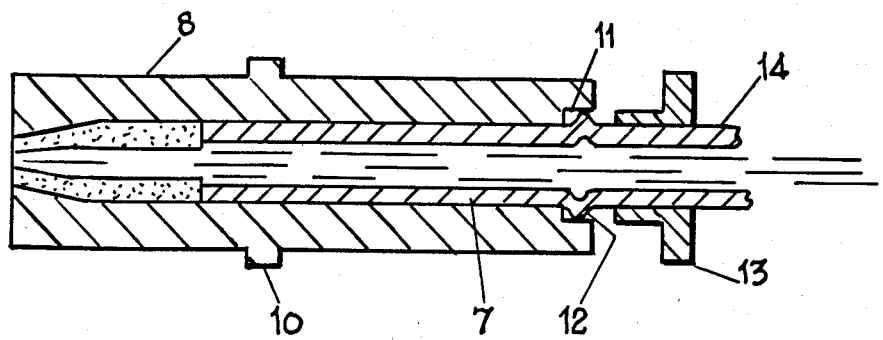

FIG. 4 is a diagrammatic cross section of a modification of the termination of FIG. 3.

Referring to FIG. 1 of the drawings, an optical fibre cable 1 has a protective sheath 15.

It will be clear that the drawings are to a much magnified scale since individual fibres are typically only several thousandths of an inch diameter. In order to make a termination on the cable for an optical coupling, the sheath 15 is first removed for a suitable length. The fibres are then cut square to the axis to form a coupling surface. In the preferred method to be described, the fibres are first inserted in a close fitting glass ferrule. This can be a time consuming operation because of the tendency for the peripheral fibres to splay out very slightly. The tool shown in FIG. 1 may therefore be used in a preliminary forming operation.

The tool, shown diagrammatically, comprises a heating member consisting of a graphite cylinder 16 having a tapered hole 17 leading to a cylindrical bore 18. The maximum diameter of the hole 17 clearly exceeds the diameter of the bundle of fibres 1 and the minimum diameter is smaller than would be that of the fully compressed bundle. The taper of the hole is sufficiently gradual as to produce little likelihood of 'buckling' of the outer fibres in direct contact with the hole wall.

The use of graphite has advantages of very low friction in this latter respect and the property of not adhering to glass.

In an alternative construction however, the body of the member 16 may be of metal for good heat conduction and only the surface of the tapered hole be coated with graphite.

The member 16 is heated by an electrical resistance winding 19, which is effective to produce a temperature approaching 600° C. Graphite tends to break up if maintained continuously at this temperature so the heating is preferably performed only as necessary.

Having heated the member 16, the bundle of fibres 1 is pressed into the hole 17, the pressure being maintained until the fibres soften and slip further in as the overall cross section reduces. The heat and pressure consolidates the fibres and makes them adhere to each other, although without any substantial fusion between fibres. The fibres therefore retain their identity as individual optical paths.

The bundle of fibres, with its tapered and consolidated end form is then easy to manipulate and in particular, is easy to insert in a hole which would be a close fit on the bundle of fibres in their uncompressed form.

Referring now to FIGS. 2(a) and (b), the thin-walled glass ferrule 2 has such a bore. The diagram is again very much magnified, since the ferrule diameter is typically about 1–2 millimeters. The thermal characteristics of the glass ferrule are similar to those of the optical fibres. After the above performing stage, the fibres, which were originally of circular cross section having been drawn from bulk material in known manner, are partially deformed but there are still substantial interstices between adjacent fibres. The fibre bundle is then inserted through the glass ferrule 2, which is now a simple matter.

A metal tool 3 is fitted with a source of heat similar to that of FIG. 1. The tool is of circular cross section and has a tapered hole 4 bored in the end face with a drilled out portion 6 at the apex. The angle of the taper is about 8° although this is exaggerated in the diagram for clarity. A guide member 5 fits on and is detachably fixed to the tool 3. It has a central hole with a lead-in to act as a guide for the cable.

The ferrule 2 and fibre bundle 1 are inserted through the guide member 5 and into abutment with the tapered surface of the hole 4. The tool is heated to a temperature between 520° and 580° C. and the ferrule 2 together with the enclosed fibre bundle 1 is forced into the hole. Very little force is in fact required as the ferrule and the ends of the fibres are softened under the temperature produced. This operation may be effected by manual pressure on a ring tool engaging the rear end of the ferrule 2 or by tightening a hollow nut (not shown) which engages (by means of a split insert) the rear end of the ferrule 2 and has a screw thread engagement with the guide member 5 or the tool 3. The extent to which the ferrule and fibre bundle are pressed into the tool 3 can be determined, in such an arrangement by a stop feature limiting the travel of the nut.

The effect of forcing the cable into the tapered hole 4 is shown in FIG. 2(b). The ferrule 2 is compressed on to the fibres which, subject to the temperature and the pressure, are gently deformed from their circular shape to an approximately hexagonal shape in which they interlock and occupy the available cross section substantially completely. There will therefore be a significant reduction in the 'dead area' within the cable cross section. The drilled hole 6 is of such a diameter as to just accept the compressed ferrule when the interstices are largely removed. The transition between the taper and the cylindrical hole 6 can with advantage be made gradual.

Compression of the cable termination is facilitated by rotation of the ferrule and fibre bundle while it is being forced into the tapered hole. Such rotation is, in turn, facilitated by coating the surface of the tool 3 with graphite thus preventing the sticking of the glass ferrule to the metal surface.

In compressing the fibre bundle as shown in FIG. 2, it is again ensured that whilst the interstices are substantially eliminated the fibres do not fuse to any substantial extent into a form in which their individuality is lost. Such fusion would cause loss of light by escape through the fused surfaces and also cause brittleness of the termination. Fusion is avoided by limiting the temperature and the pressure to which the fibres are subjected. Some control over the pressure is provided by adjustment of the angle of the taper.

When the termination has been formed as described, the cable is removed from the tool and the end is ground and polished. A circular mosaic of fibres is then revealed which is concentric with the outside wall of the ferrule. There are a number of useful features associated with this technique apart from the reduction of interstitial dead space. Firstly, because the compressed fibre bundle is concentric with the ferrule, alignment with another terminated fibre bundle can be obtained simply by aligning the outside of the two abutted ferrules. Another feature of this particular embodiment is that because only glass is found in the terminated end it is much easier to polish. In the manufacture of bonded fibre terminations the adhesive can smear across the fibre ends and chipping of the fibre ends may occur due to erosion by the adhesive during the polishing process.

The glass termination is preferably protected by an outer metal ferrule bonded to the glass ferrule, the metal ferrule then forming part of the mechanical coupling.

In a modification of the above construction, the glass ferrule 2 may be replaced by a deformable metal ferrule of suitable softness and melting point characteristics.

An alternative construction and method are illustrated in FIG. 3. After the preliminary forming operation illustrated in FIG. 1, the bundle of fibres 1 is again fitted with a thin walled glass ferrule 2 but in this case an inner metal driving ferrule 7 is fitted over the fibre bundle first. This driving ferrule 7 is an easy fit on the fibre bundle.

A die member in the form of an outer metal ferrule 8 of substantial wall thickness compared to the glass ferrule 2, is preformed with internal and external tapers on the end portion as shown. The internal taper provides a die portion as will be explained. The tapers conform to the taper of a hole 4 in a heating tool 3 so that there is good heat transfer between the tool 3 and the ferrule 8. The ferrule 8 is then fitted over the glass ferrule 2 and the driving ferrule 7 on both of which it is a close fit. The assembly is then inserted into the hole 4 in the heating tool, coated with graphite as before, and the heater is energised. A flange 9 on the driving ferrule 7 is used to drive the ferrule 7 against the glass ferrule 2 thus forcing it gently into the tapered region of the outer ferrule 8. As it enters this portion, the effect of the heat, conducted through the ferrule 8, and the pressure on the glass ferrule, is again to deform the fibres so as to eliminate substantially the interstices of the fibre bundle. The fibre deformation decreases from a maximum at the leading end of the fibre bundle to zero at the parallel portion of the ferrule 8. When the flange 9 abuts the outer ferrule 8 it is arranged that the maximum necessary deformation of the fibres has occurred. The termination is then removed from the tool 3 and ground and polished as before.

Again, the temperature and pressure are restricted to ensure that no fusion between fibres takes place.

The metal of the outer ferrule 8 should be matched in thermal characteristics to the glass of the ferrule 2 so that no cracking occurs on cooling. Replacement of the glass ferrule in this embodiment by a metal one of suitable characteristics provides a further alternative construction.

The deformable ferrule 2 has been referred to as being of glass throughout the above description but it will be appreciated that this embraces any vitreous material of suitable thermal and viscosity characteristics.

The tool 3 that is used both as a jig and as a heating source in the above method, may be a portable device of size comparable with a soldering iron. Such a hand tool is then suitable for factory assembly or for on-site construction of the cable terminations.

FIG. 4 illustrates a modification of the construction of FIG. 3. In this modification the outer ferrule 8 is of generally cylindrical outer form and constitutes a male member, i.e. a pin, of a male and female optical coupling. The depth of engagement in the female portion is determined by an external annulus 10.

The rear end of the outer ferrule 8 is internally rebated (11) to receive an annular upset 12 in the driving ferrule 7. This annular upset 12 is formed on the driving ferrule to provide a purchase for a ram tool 13. By such means the driving ferrule 7 protects the optical fibres 1 from any damage through contact with the ram tool. In this embodiment the outer ferrule 8 may be of sufficient strength itself to form a substitute for the die 3 of FIGS. 2 and 3, in which case it need only be inserted in a heating winding prior to operation of the ram tool. Alternatively, the outer ferrule 8 is inserted in a close fitting cylindrical hole in a tool otherwise similar to the tool 3, which then provides both a heating source and physical support. In this case the tool 3 is preferably split in an axial plane to facilitate removal of the pin termination after the compression operation.

The backward extension 14 of the driving ferrule 7 may be inserted inside the sheath of the cable, the sheath then being fastened on to it. The fibres are thus protected where they emerge from the sheath.

The positioning of the upset 12 on the driving ferrule also provides a simple substitute for the flange 9 in FIG. 3 in determining the depth of penetration of the driving ferrule 7.

The end of the ferrule 8, around the rebate 11, may be swaged over the upset 12 to lock the driving ferrule in position.

Fibre bundles are commonly embedded in greasy lubricating material inside a sheath. Termination according to the described methods can then be achieved by stripping back a few inches of the sheath, removing the greater part of the lubricating material with a suitable solvent and proceeding as described.

I claim:

1. A method of terminating an optical fibre cable comprising a bundle of optical fibres, the method employing a die member and a deformable ferrule to enclose the fibre ends, the method including the steps of inserting the fibre ends into said deformable ferrule, heating said die member, and compressing said deformable ferrule onto said fibres by pushing the deformable ferrule axially into a tapered hole in said die member conductively to subject the fibre ends to heat from the die member and to deform them without any substantial fusion between individual ones of said fibres, so eliminating to a substantial extent any spaces between said fibre ends.

2. A method according to claim 1 wherein said die member comprises an outer ferrule, one end of said outer ferrule being a sliding fit over said deformable ferrule and the other end having an internal inwardly tapered die portion, said deformable ferrule and said optical fibres being inserted through said one end and forced into said die portion.

3. A method according to claim 1 wherein said deformable ferrule is of a glass material.

4. A method of terminating an optical fibre cable comprising a bundle of optical fibres, the method including the step of heating the fibres, the step of radially compressing the fibres to deform them without any substantial fusion between individual ones of said fibres and to eliminate to a substantial extent any spaces between said fibres by employing a deformable ferrule, the step of inserting said fibres into said deformable ferrule and compressing said deformable ferrule onto said fibres, said deformable ferrule and the enclosed fibres being compressed by forcing the deformable ferrule axially into a tapered hole in a die member which comprises an outer ferrule, one end of said outer ferrule being a sliding fit over said deformable ferrule and the other end having an internal inwardly tapered die portion, said deformable ferrule and said optical fibres being inserted through said one end and forced into said die portion, and the step of forcing an inner metal driving ferrule, which is an easy fit around the optical fibres and a close fit within said outer ferrule, into said outer ferrule to drive said deformable ferrule and the enclosed fibres into said die portion of the outer ferrule.

5. A method of terminating an optical fibre cable comprising a bundle of optical fibres, the method including the step of heating the fibres, the step of radially compressing the fibres to deform them without any substantial fusion between individual ones of said fibres and to eliminate to a substantial extent any spaces between said fibres by employing a deformable ferrule, the step of inserting said fibres into said deformable ferrule and compressing said deformable ferrule onto said fibres, said deformable ferrule and the enclosed fibres being compressed by forcing the deformable ferrule axially into a tapered hole in a die member which comprises an outer ferrule having an external taper, one end of said outer ferrule being a sliding fit over said deformable ferrule and the other end having an internal inwardly tapered die portion, said deformable ferrule and said optical fibres being inserted through said one end and forced into said die portion, and the step of heating by conduction from a heating member having a tapered hole complementary to said external taper, said heating member supporting and heating the outer ferrule when said deformable ferrule is forced into it.

6. A method of terminating an optical fibre cable comprising a bundle of optical fibres, the method including the step of heating the fibres, the step of radially compressing the fibres to deform them without any substantial fusion between individual ones of said fibres and to eliminate to a substantial extent any spaces between said fibres by employing a deformable ferrule, the step of inserting said fibres into said deformable ferrule and compressing said deformable ferrule onto said fibres, said deformable ferrule and the enclosed fibres being compressed by forcing the deformable ferrule axially into a tapered hole in a die member which comprises an outer metal ferrule, one end of said outer ferrule being a sliding fit over said deformable ferrule and the other end having an internal inwardly tapered die portion, said deformable ferrule and said optical fibres being inserted through said one end and forced into said die portion.

7. A method according to claim 4, wherein said driving ferrule has a surface portion which is engaged by a ram tool to force the driving ferrule and the deformable ferrule into the outer ferrule.

8. A method according to claim 7, wherein said driving ferrule includes a collar having an abutment surface constituting said surface portion.

9. A method according to claim 7, wherein said driving ferrule is forced into said outer ferrule until said abutment surface engages a stop part of the outer ferrule.

* * * * *